Sept. 16, 1947.  C. R. BUSCH  2,427,548
END GUIDED BRAKE BEAM
Filed June 28, 1944  4 Sheets-Sheet 3
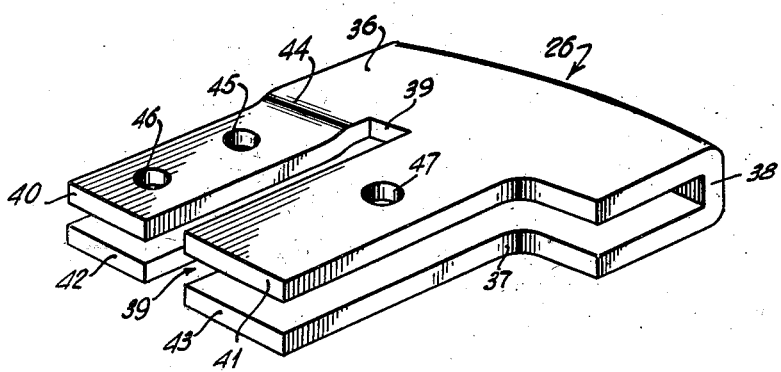
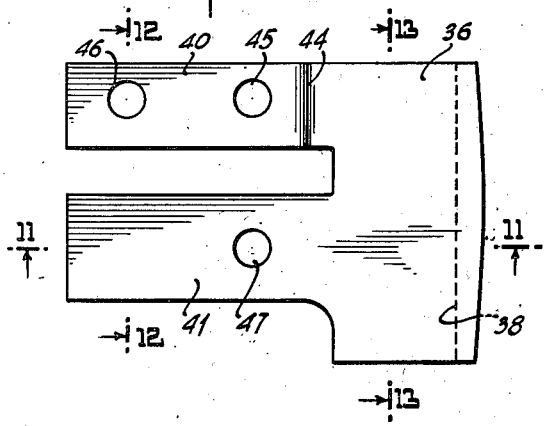
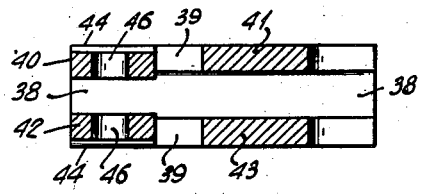
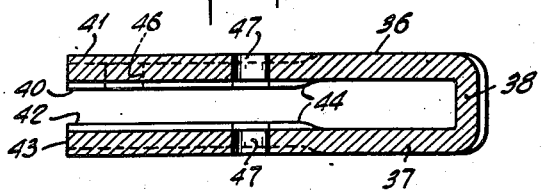
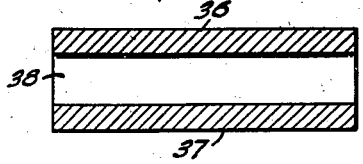
INVENTOR
*Charles R. Busch.*
BY
*Geo. L. Wheelock*
ATTORNEY Sept. 16, 1947.  C. R. BUSCH  2,427,548
END GUIDED BRAKE BEAM
Filed June 28, 1944  4 Sheets-Sheet 4
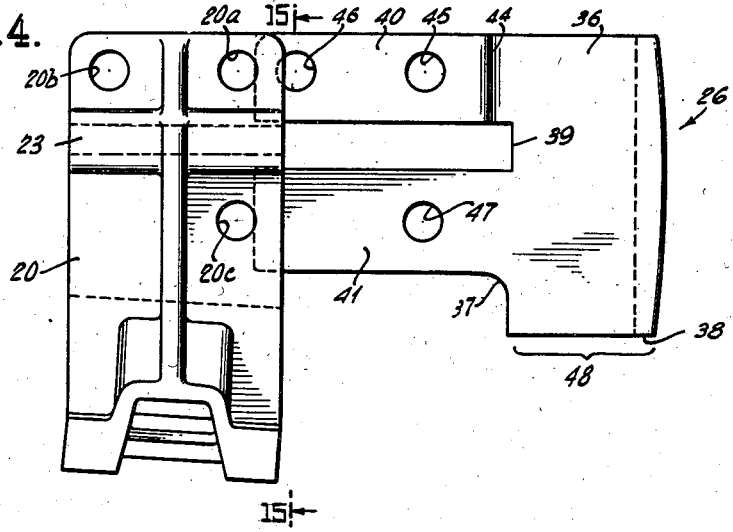
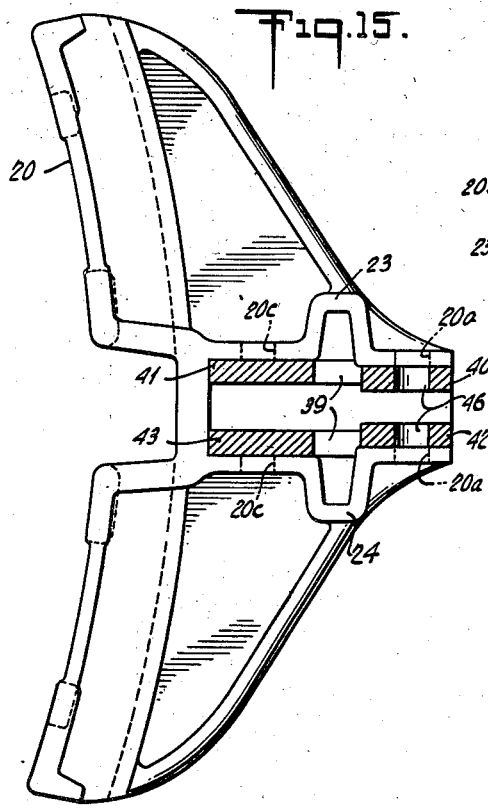
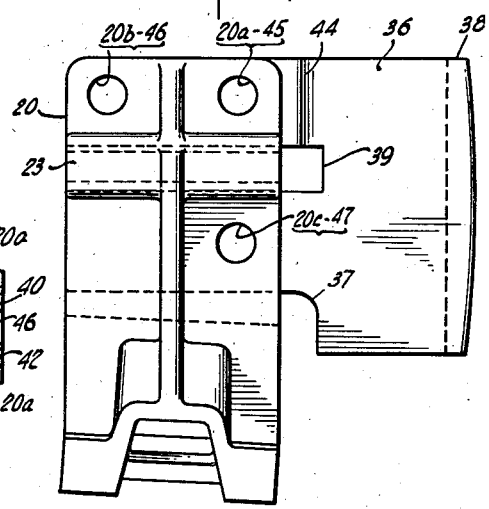
INVENTOR
CHARLES R. BUSCH.
BY
Geo. L. Wheelock
ATTORNEY Patented Sept. 16, 1947

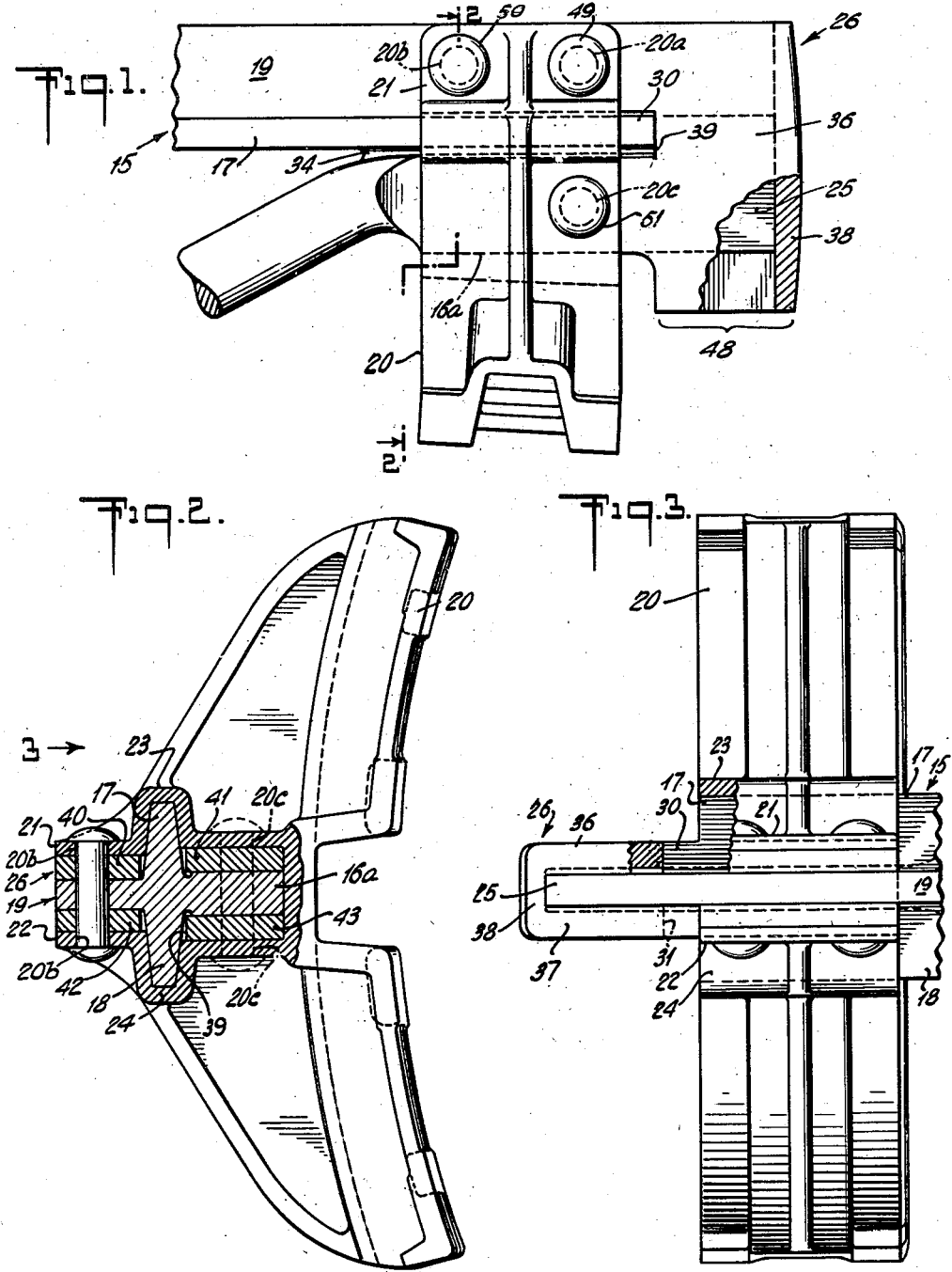

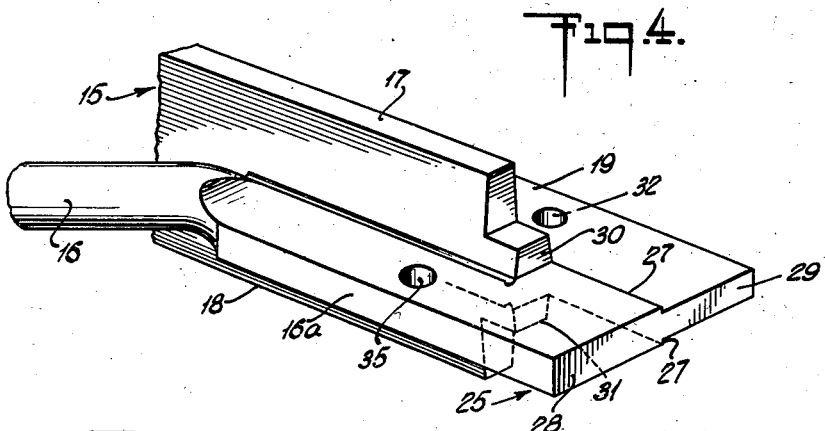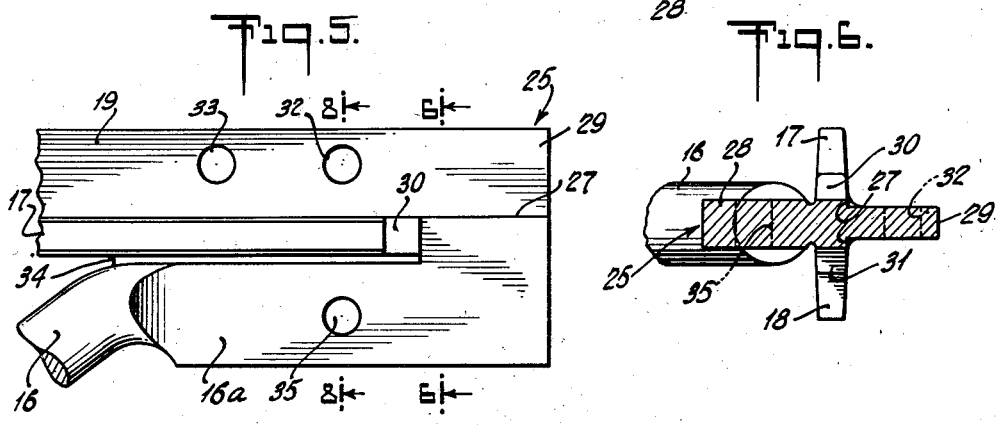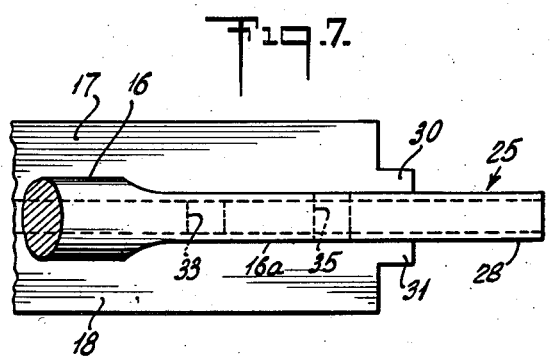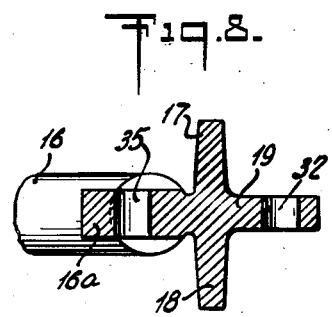

2,427,548

UNITED STATES PATENT OFFICE 2,427,548

END GUIDED BRAKE BEAM

Charles R. Busch, Orange, N. J., assignor to Buffalo Brake Beam Company, New York, N. Y., a corporation of New York Application June 28, 1944, Serial No. 542,473

30 Claims. (Cl. 188—222)

The present invention relates to brake beams for railway car trucks which are adapted to be guided by their end portions upon supporting members of a truck, whether they be the truck side frames as such, or are other members of a truck suitable for supporting a brake beam, such as journal boxes, for example; while in some respects the invention is applicable whether a beam be guided outwardly or inwardly of the vertical plane of the car wheel.

A brake beam to which the present invention is more particularly adapted is disclosed in Patents No. 2,170,113, of August 22, 1939, and No. 2,193,580 of March 12, 1940, in which the beam has an integral truss having at each end a symmetric brake head, that is, the upper and lower halves of each head are identical one with the other, above and below the inclined plane in which the beam is guided. In said patents the vertical flanges of the compression member stop directly at the inward surface of the brake head, and the result in actual practice has been that occasionally a fracture or breakage of the beam takes place directly at the angles between those flanges and the inward surface of the head.

An important object of the present invention is to overcome the possibility mentioned, and it has therefore been decided to extend the vertical flanges of the beam not only entirely through the brake heads, each of which preferably but not necessarily has a pair of back jaws rigidly fitted onto a cruciform section of the beam, but also to maintain or produce additional strength in the ends of the beam in the usual case where they extend beyond the heads, so that the danger of even occasional fracture or breakage of the beam is entirely prevented. With a view to also overcoming this latter possibility although the vertical flanges or their equivalent are omitted, as such, outwardly of the brake heads, it is herein proposed to leave, on both ends of the beam, reduced protruding portions of the ends of the flanges, located within the corner of each angle formed between the vertical plane of the end edges of the flanges and the upper and lower surfaces of the corresponding end portion of the beam, both end portions constituting extensions of the beam adapted to serve as supports for the beam on or in the guides of the car truck members.

By thus leaving the reduced protruding portions of the flanges there are provided, at points directly adjoining the outer limits of the regions of the beam at which the brake heads are applied and fixed, reinforcing, preferably step-like, fillets, located between the end edges of the vertical flanges proper and the supporting end extensions of the beam, which are intended to strengthen it and remove danger of fracture or breakage of the beam at or adjacent the inner ends of the extensions.

Another object of the invention preferably obtained is to provide a unit consisting of a symmetrical brake head having a pair of open back jaws and, assembled therewith, a wear protecting member for either end of the beam, adapted in such a peculiar manner to fit within the jaws as that, when the unit is assembled, the unit may be mounted upon and fixed to either end of the beam. Other incidental objects are to provide highly efficient wear members for protecting the guided end extensions of a brake beam and to increase the efficiency of brake heads when provided with back jaws for mounting on the beam.

The preceding objects of the invention, and others as will appear herefrom, being among the preferred objects of the present invention, the same consists of certain features of construction and combinations of parts to be hereinafter described and then claimed, with reference to the accompanying drawings which show the preferred construction for either end of the beam, as the construction is the same for both ends, and in which drawings—

Fig. 1 is a plan view of one end of an end guidable truss brake beam with wear member and brake head according to the present invention, parts being in dotted lines and the wear member partly broken away;

Fig. 2 is a transverse section on line 2—2 of Fig. 1, viewed in the direction of the arrows;

Fig. 3 is a rear elevation of Fig. 2, viewed in the arrow's direction;

Fig. 4 is a perspective view of one end of the brake beam proper;

Fig. 5 is a plan of the same end of the beam proper;

Fig. 6 is a transverse section on line 6—6, Fig. 5, viewed in the direction of the arrows;

Fig. 7 is a front elevation looking toward the tension member, Fig. 5;

Fig. 8 is a transverse section on line 8—8, Fig. 5, viewed in the direction of the arrows;

Fig. 9 is a perspective view of the wear protecting member;

Fig. 10 is a plan of the member;

Fig. 11 is a longitudinal section of the member, on line 11—11, Fig. 10, viewed in the direction of the arrows;

Fig. 12 is a transverse section on line 12—12, Fig. 10, in the direction of the arrows;

Fig. 13 is a transverse section on line 13—13, Fig. 10;

Fig. 14 is a top plan showing the wear protecting member and brake head about to be combined as a unit;

Fig. 15 is a section on line 15—15, Fig. 14; and

Fig. 16 is a top plan, showing the protecting member and brake head fully combined as a unit.

As the brake beam proper is generally of well known integral truss type and as the present improvements are to be used at each end of the beam, only one end portion of the beam is shown in the drawings. When such a beam proper is made in one piece, the blank, of steel or the like therefor is most commonly slitted lengthwise, short of the ends, and the truss formed in a powerful press, with the use of suitable fixtures, and the beam shortened and expanded at both sides of the slit to form a compression member 15 and a tension member 16, Figs. 1 and 4, and any suitable strut may be used between the two members. In the instant case the beam is made of such length as to adapt it to be guided at its ends on the car truck.

Referring to Figs. 1 to 8 inclusive, it will be apparent that the original blank for the beam, being preferably of cruciform shape in cross section, the truss beam proper formed therefrom will provide it with a compression member having oppositely directed vertical flanges 17, 18, at the front and with a horizontal flange 19 at the back.

The brake head 20 (Figs. 1, 2, 3) is preferably composed of a malleable steel casting formed into symmetrical shape to provide similar upper and lower halves. Such head is provided at its back with a pair of rearwardly extending jaws, 21, 22, crosswise of its middle portion, and these in turn are formed into channeled transverse ribs 23, 24, which project from the jaws in opposite directions whereby to provide, socket portions having grooves for receiving the end portions of the vertical flanges 17, 18, which here, in the region of the beam which is to receive the head, become parts of the retained cruciform shape. The channeled ribs 23, 24, reinforce the jaws from edge to edge so that but a minimum amount of metal is required in the brake head.

A flattened portion 16ª extends from the end of tension member 16, and, as it is a part of the retained cruciform section, it lies in the same plane as the flange 19 of the compression member 15. The portion 16ª of the tension member and the compression member are here integrally joined and project, beyond the region to receive the head, in the form of a substantially flat end extension 25 of the beam providing, with a similar extension at the other end of the beam, means for supporting it for guidance on a car truck.

A wear protecting or receiving member 26 on which the brake head is mounted encloses the end extension 25 of the beam to guard against wear of the same, such member to be explained in detail hereinafter.

The particular preferred construction of each end of the beam is best shown in detail in Figs. 4 to 8 inclusive, as they illustrate the same before head 20 and wear protecting member 26 are mounted thereon. These figures disclose that the flattened end portion 16ª of the tension member has greater vertical thickness than the back flange 19 of the compression member, and that these relatively different thicknesses prevail in the end extension 25. The result of such formation is that upper and lower shoulders 27, 27, extending longitudinally of extension 25, define the thick portion 28 and the thinner portion 29 thereof.

A quite important feature of the invention resides in two upper and lower, preferably, step-like, cubical shaped, elements 30, 31 at the ends of the flanges 17, 18 of the compression member and which fill the corners which would otherwise be left between the upper and lower surfaces of the guiding end—extension 25 and the adjacent vertical end surfaces or edges of the said flanges. In the main these elements constitute fillets in the corners between such surfaces to supplement or reinforce the strength of the beam and overcome any tendency of the beam to fracture at those places. These step elements are preferably of substantially rectangular outlines and each has a vertical depth which is approximately the same as, or possibly slightly less than, the thickness of the plate of metal from which the wear protecting member 26 is formed.

In the back flange 19 of the beam there are formed two rivet holes 32, 33, which are located in the section thereof lying approximately between the steps or fillets 30, 31 and a transverse line which would pass through the point at 34 where the tension member merges in one piece with the compression member, while the flat portion 16ª of the tension member has a rivet hole 35.

Figs. 9–13 inclusive illustrate in detail the wear protecting member 26. It is a metal body preferably of spring steel to prevent wear of the ends of the beam, and in fact it is so hard that it should last indefinitely. It is preformed into substantially U-shape lengthwise so as to fit like a cap or shoe on the beam. In detail member 26 has two opposite, parallel, jawlike walls, 36, 37, connected by an arcuate shaped terminal wall 38, and each of these walls preferably has a minimum width approximating the width of the beam across the transverse width of the compression member 15 and the end portion 16ª of the tension member, and a maximum width suitably greater.

Each of the parallel walls or jaws 36, 37, of member 26 has a longitudinal open slot 39 therein and each slot preferably has a definite length for reasons to be explained. The slots 39, 39, are directly opposite to and parallel with each other. The provision of the slots 39, 39, leaves the wall 36 with two parallel arms 40, 41, and the wall 37 with two corresponding parallel arms 42, 43, the arms 40, 42, being opposed to each other as also are the arms 41, 43.

However, the spacing apart of the pair of opposed arms 41, 43 is preferably the same as that of the walls 36, 37, from which they are formed, whereas the spacing apart of the pair of opposed arms 40, 42, is preferably less than this, which is caused by fabricating the metal so as to deflect the same toward each other so that the flat upper and lower surfaces thereof are brought out of the planes of the corresponding surfaces of the walls 36, 37, as is clear from Figs. 9, 11 and 12. The spacing apart of the arms 41, 43 corresponds with the thickness of the tension member portion 16ª while that of the arms 40, 42 corresponds with the thickness of the back flange 19 of the compression member.

The wear cap or shoe or wear protecting portions proper formed by the remaining areas of walls 36, 37 and the wall 38 lie outwardly beyond the arms 40, 41, 42, 43, and as the spacing between the said areas of the walls 36, 37, is the same throughout, whereas the spacing between the arms 40, 42, is less, the portions of the walls adjacent the same are suitably reinforced and strengthened by the transverse shoulders 44 formed by the deflection of arms 40, 42. The arms 40, 42 have rivet holes 45, 46, and the arms 41, 43 have rivet holes 47, all of them spaced for ultimately registering with corresponding rivet holes 32, 33 and 35 in the brake beam.

By shaping and forming the member 26 as described and with similar halves, the halves will have corresponding opposite, and mutually facing, longitudinally extending minor portions, whose outermost and innermost flat surfaces throughout their length are depressed inwardly of the outermost and innermost flat surfaces of the remaining or longitudinally extending major portions of the halves, the said surfaces of the major portions also being flat throughout their length.

Outwardly and forwardly of the arms of the wear protecting cap or shoe, the same is formed with a laterally projecting nose portion 48 adapted to project in advance of the guided end of the beam when the cap is mounted on it.

The beam, the wear member and the head described are shown in Figs. 1, 2 and 3 fully assembled and fixed at one end of the beam, the assembly being the same at the other end not shown. To assemble these elements, the brake head 29 and the wear protecting member 26 are first slid or telescoped together to register the rivet holes 20ª, 20ᵇ, 20ᶜ, in the back jaws of the head with the corresponding holes 45, 46, 47, of said member. As the tip or terminal parts of the jaws 21, 22, of the head, and which lie to one side and back of the recessed rib portions 23, 24, are closer together than the inward parts which lie to the other side of said portions 23, 24, and are spaced just enough apart to engage the upper surface of the wear member arm 40 and the lower surface of the arm 42 so that the engaged surfaces are spaced a less distance apart than the engaged surfaces of the jaws and the arms 41, 43, provision is thereby made to assure that the wear member and the head may be slid together so that they will have a definite final relation one to the other. This is most desirable where the brake head has a pair of open back jaws as preferred. In other words, when the head and the wear-member arms are held at right angles to one another and the arms caused to enter between the jaws of the head, as shown in Figs. 14 and 15, to produce the engagement and relation just described, the two elements, the head and the wear member, can be forced together rectilinearly and definitely guided along straight lines, which are parallel with the length of the brake beam to which the so assembled elements are to be ultimately affixed and secured, thereby assuring a definite relative position of the head and wear member one to the other and their combination as a unit, shown in Fig. 16.

As it is the best practice that the brake head be spaced away from the nose portion 48 of the wear cap when the head and the cap are assembled, it will be seen that the shoulders 44 of the cap serve as stops to prevent the head and nose portion abutting against each other.

The brake head and wear member thus assembled are then slidingly mounted as a unit on the brake beam, by engaging the recessed rib portions 23, 24 of the jaws of the head with the vertical flanges 17, 18, of the beam, while simultaneously engaging the arms 41, 43 with tension-rod portion 16ª and the arms 40, 42, with back flange 19. At the same time the flanges 17, 18, are entered in the slots 39, 39, of the wear member until the fillets 30, 31, abut the closed ends of the slots. When the assembled head and wear member are in their ultimate position on the beam the steps or fillets 30, 31 act as stops and will be interlocked within the closed inner ends of the slots, and the terminal wall 38 of the wear member may possibly abut the end or terminal surface of the beam, or rather the transverse end surface of the beam guiding and supporting member 25 which terminates the beam. When the parts are thus assembled strong rivets 49, 50, 51, are driven through the registering holes of the brake head and the wear member and the holes 32, 33, 35 of the brake beam, which will now register with aforesaid holes, and then the ends of the rivets are headed down.

A brake beam with a suitable strut and more or less of the type described and having rigidly mounted thereon at the ends brake heads and wear members more or less of the kind described, constitutes an absolutely strong and safe entity, for use on railway car trucks in which the ends of the beam are guided on suitable supporting members, located either outwardly or inwardly of the truck wheels. It will furthermore be seen that the brake head and wear member are so constructed as to be useable at either end of a brake beam, when they are constructed as described, inasmuch as with respect to the middle horizontal plane of the beam each half of each is identical with the other half.

It should be stated as to the wear resisting or protecting member itself, but in a manner differently expressed than hereinbefore, that in its preferred embodiment its opposite walls 36, 37, are generally rectangular in outline and connected together along two corresponding ends by the end wall 38, the walls 36, 37 being free from each other at the other three edges of each, and that in relation to such arrangement the member is provided with means between and parallel with the lateral edges of each wall, and adapted to center the member by sliding it endwise to a definite position onto the extended end of a guidable brake beam, such centering means spaced a distance inwardly away from the end connection 38 so as to leave bearing areas between said connection and the centering means of sufficient size for guiding the beam.

What I claim as new and of my invention is:

1. An integral brake beam with a horizontal beam supporting and guiding extension outwardly beyond the brake head receiving region thereof, in which region the beam has at least two flanges at substantially right angles to each other, one of which merges into the said extension in the horizontal plane thereof, and the beam locally reinforced for a relatively short distance against fracture or breakage directly adjoining the outward limit of such region, the other of said flanges terminating at such limit.

2. An integral brake beam of cruciform cross section at the brake head receiving region thereof to provide vertical and horizontal flanges, and the beam provided with a supporting and guiding extension outwardly beyond the brake head receiving region and lying in the plane of the horizontal flanges, and the beam having step-like fillets of less vertical extent than the vertical flanges and located in the corners between the vertical flanges and the outward extension, and inwardly of the extension, for reinforcing the strength of the beam.

3. An integral truss brake beam of cruciform cross section at the brake head receiving region thereof to provide two vertical flanges and two horizontal flanges, the vertical flanges and one of the horizontal flanges extending from the compression member of the beam and the other horizontal flange extending from the tension member, the horizontal flanges having flat surfaces, such beam provided with a substantially horizontal beam supporting and guiding extension outwardly beyond the brake head receiving region and having flat surfaces merging with and lying in the planes of the flat surfaces of the horizontal flanges, and the beam having fillets of less vertical extent than the vertical flanges, and located in the corners between the vertical flanges and the outward extension, for reinforcing the strength of the beam.

4. A brake head provided with a pair of spaced, transverse, back jaws having oppositely projecting, transverse, channeled ribs reinforcing the jaws and providing socket or grooved portions, the inner, upper and lower surfaces of the parts of the jaws behind the rib portions being disposed in horizontal planes between the horizontal planes of the corresponding inner surfaces of the parts forward of the socket portions.

5. A wear protecting member for the extended end of an end-guided brake beam, such member comprising a shoe-like body of wear resisting metal having generally rectangular and parallel flat walls connected together along two corresponding ends and spaced apart at the other two corresponding ends as well as at the lateral edges of each wall from end to end of the walls, and the member having centering means between and parallel with such lateral edges, such centering means spaced a distance inwardly away from the end connection between the walls to leave plain bearing areas adjacent the end connection, such means extending to the opposite ends of the walls, whereby the member may be slid endwise to a definite position with the end of a beam or a definite position onto the end of a beam or into a brake head.

6. A wear protecting member for the end of an end-guided brake beam, comprising a cap or shoe body to fit on such end and to extend beyond a brake head thereon, and relatively harder than the end, and having upper and lower opposite walls and a transverse terminal wall connecting them, and the opposite walls having a pair of opposite parallel and relatively short slots which extend substantially at right angles to the terminal wall from points spaced therefrom for a distance inwardly of that portion of the member which is adapted to project beyond the brake head, so as to leave wear protecting surfaces proper in advance of such slots, said slots opening out through the rear edges of said opposite walls.

7. A wear protecting member for the end of an end-guided brake beam, according to claim 6, wherein the slotting of said walls by the relatively short slots provides two pairs of opposed arms, one pair at each side of the slots.

8. A wear protecting member for the end of an end-guided brake beam, according to claim 6, wherein the slotted walls provide two pairs of opposed arms and the arms of one pair lie in planes between the upper and lower surfaces of the arms of the other pair.

9. A wear protecting member for the end of a flanged end-guided brake beam which end is extended beyond the flange, comprising a cap or shoe body to fit onto such end and having a wall thereof slotted longitudinally a spaced distance away from the transverse terminal surface of the body to provide relatively short parallel arms, independent of each other at the sides of the slot, such arms and slot constituting means for centering the member on the flange and the end extension of the brake beam.

10. A wear protecting member for the end of an end-guided brake beam, comprising a cap or shoe body to fit onto such end and having four parallel arms, arranged in separate pairs laterally of each other, one pair of arms having opposite transverse shoulders connecting them with the walls of the body, and the arms of said pair extending away from said shoulders at a less distance apart than the arms of the other pair.

11. A wear protecting member for the end of an end-guided brake beam, according to claim 10, whereof a forward nose laterally projecting from the member has a width which approximates the distance between the terminal surface of the member and the adjacent ends of the arms.

12. A wear protecting member for the end of an end-guided brake beam, comprising two substantially similarly shaped upper and lower halves, corresponding opposite and mutually facing flat minor portions of the halves having their outermost and innermost surfaces depressed inwardly of the outermost and innermost surfaces of the remaining or major portions of the halves, all of the said surfaces being flat throughout their length.

13. An assembled unit for mounting on the end of an end-guided brake beam, including a brake head having a pair of spaced apart back jaws, and a wear protecting member in the form of a cap or shoe to fit onto the end of a beam and engage with the opposed inner surfaces of the jaws, the jaws and the wear protecting member having mutually engaging surfaces transverse of the jaws and longitudinal of the wear protecting member, which surfaces are spaced at different distances apart vertically of the jaws, to require a right angular position of the head and wear protecting member to each other when first inserting the leading edges of the wear protecting member between the jaws and until such insertion is completed to fully assemble the head and wear protecting member as a unit.

14. An assembled unit for mounting on the end of an end-guided brake beam, according to claim 13, wherein such differently spaced surfaces are provided by inner end parts of the jaws and a pair of longitudinal arms on the wear protecting member and by outer end parts of the jaws and an additional pair of longitudinal arms on the wear protecting member, which outer end parts and additional arms have their engaging surfaces spaced less apart than the engaging surfaces of the inner end parts of the jaws and the first said pair of arms.

15. The combination of a brake beam, a brake head provided with means for mounting it on the beam, a beam end wear protecting and beam guiding member secured on the end of the beam and secured to and extending beyond the head and secured to an end extension of the beam, and strengthening means on the beam having its over-all depth reduced to a less distance relatively to the distance between the inner upper and lower surfaces of the mounting means, and located in the corners between the outward lateral surface of the head and the end extension of the beam to reinforce the beam and eliminate or minimize possible fracture or breakage of the beam end at points inwardly of the end.

16. The combination, according to claim 15, wherein the beam strengthening means resides in step-like fillets which are relatively short in length compared with the length of the extension of the beam beyond the head.

17. The combination of a brake beam, a brake head, a cap or shoe-like wear protecting and beam guiding member on an end of the beam extended beyond the brake head and into such member, the head having a pair of spaced back jaws provided with transverse parallel, recessed portions projecting in opposite directions from the jaws, at corresponding intermediate parts of the jaws, the beam having a cruciform cross section between the jaws, forming a pair of vertical flanges and horizontal front and back flanges, the vertical flanges engaged in said recessed portions, and the wear protecting member having upper and lower walls provided with a pair of arms extending between and transversely of the parts of the jaws in advance of such recessed portions and engaged therewith and with the front flange of the beam, and the said protecting member provided with an additional pair of arms parallel with aforesaid arms, the additional arms extending between and transversely of the parts of the jaws back of such recessed portions and engaged therewith and with the back flange of the beam.

18. The combination according to claim 17, wherein the arms of the pair back of the recessed portions are spaced a less distance apart than the arms in front thereof, and rivets passing through the jaws, the arms and the flanges to secure the beam, the wear protecting member and the brake head together.

19. The combination according to claim 17, wherein the beam as provided with reinforcing fillets located in the corners between the vertical flanges and the extended end of the beam, said fillets directly adjoining the outermost lateral face of the head and engaged between and with the inner ends of the two pairs of arms.

20. A flat strip of bendable wear resisting material bent intermediately of its terminals to provide parallel walls, and adapted to fit onto the guiding end portion of a brake beam which is flanged inwardly of the end portion, the free end portions of the walls having opposite open end slots extending toward and spaced a distance from the bend of the strip, providing means for centering the wear strip on the end portion and flange of said beam, and the remaining portions of the walls providing means for protecting such end portion of the beam against wear.

21. A flat strip of wear resisting material formed as a cap or shoe adapted to fit along and protect the guiding end portion of a brake beam and to fit into a brake head, the cap having stop means extending transversely of its upper and lower surfaces and located intermediate the length thereof to restrict the brake head to a position upon the inner end of the cap.

22. An assembled unit for mounting on a vertically flanged brake beam having a flat end portion for guiding the beam, such unit including a brake head having a pair of spaced apart jaws, a wear protecting member for the flat end portion of the beam which is adapted to extend beyond the head, such member comprising a flat strip of wear resisting material having an intermediate bend and parallel walls which fit between the jaws and are adapted to fit onto such flat end portion, portions of the walls of the strip member extending outwardly beyond the head and adapted to extend over the end portion, the free end portions of the walls of the strip member having opposite open end slots extending toward the bend of the strip for a distance therefrom, the jaws of the head having transverse recesses registering with the slots, and the slots and recesses adapted to receive vertical flanges of the beam.

23. An assembled unit for mounting on the end of an end guided brake beam, according to claim 22, whereof the wear member is provided with stop means adjacent the jaws of the head, whereby to restrict the head to braking position on the inner end of the wear member.

24. A brake beam including an end guided beam having means of cruciform section at a spaced distance from each end of the beam and spaced from each other, a compression member between the cruciform means which are near each end of the beam, and having upper and lower vertical flanges and a flat horizontal back flange terminating with corresponding flat flanges of the cruciform means, a tension member connecting and uniting with the compression member in front thereof, and terminating in the flat horizontal surfaces of the front flanges of such cruciform means, the beam having at its ends longitudinal guiding extensions with flat upper and lower surfaces and formed by the merging together of continuations of the back flange of the compression member and continuations of the tension member to provide the flat surfaces.

25. A brake beam according to claim 24, in combination with wear protecting members fitted onto such flat extensions and onto the horizontal flat flanges of the cruciform means, the wear members having over-all vertical dimensions substantially less than the distance between the longitudinal edges of the vertical flanges.

26. A brake beam according to claim 24 in combination with wear protecting members fitted onto such flat extensions and onto the horizontal flat flanges of the cruciform means, the wear members having over-all vertical dimensions substantially less than the distance between the longitudinal edges of the vertical flanges, the beam including also in combination therewith brake heads mounted on the inner ends of the wear members and engaging the vertical flanges of the cruciform means, and means between the heads and wear members compelling the removal of the heads from the beam with the removal of the wear members.

27. The combination with a brake beam having end extensions adapting it to be guided on car truck side members, of wear members having similar upper and lower walls protecting the extensions against wear, symmetrical brake heads removably mounted on portions of the walls which extend inwardly along the beam between the end extensions, each wear member and the head thereon constituting an assembled unit, mutually opposing means on the heads and wear members preventing separation of the heads and wear members transversely of the members, and means between the heads and such inward portions of the wear members compelling the removal of the heads from the beam with the removal of the wear members, each such unit being reversible and applicable for use on either end of the beam.

28. An integral brake beam with a horizontal beam supporting and guiding extension outwardly beyond the brake head receiving region thereof, in which region the beam has at least two walls at substantially right angles to each other, one of which merges into the said extension in the horizontal plane thereof, and the guiding extension of the beam reinforced in line with the other of the said walls for a distance beyond the outward limit of such brake head receiving region, the reinforcement being of substantially less vertical height than such other wall.

29. An assembled unit adapted to be mounted on the end portion of a brake beam which is guidable along members of a car truck, the unit including a brake head having a mutually facing pair of rearwardly extending vertically spaced elements, and at least one element of the pair having its inwardly facing surface recessed transversely of the brake head, at a distance inwardly of the outer end thereof, a wear protecting member removable from the brake head and having a length adapting it for placement along and upon the end portion of such beam, and located between and transversely of such head elements, and also extending beyond one side of the brake head, the wear member having an open end slot paralleling and registering directly with the recess of the recessed element, the slot terminating at a point adjacent said side of the head, and that portion of the wear member which is extended beyond the head outwardly of the terminal point of the slot adapted to protect and support the end of such beam against wear.

30. An assembled unit adapted to be mounted on the end portion of a brake beam, according to claim 29, also including means for preventing the separation of the wear member from the brake head except in a direction laterally of the head.

CHARLES R. BUSCH.

REFERENCES CITED

The following references are of record in the file of this patent:

UNITED STATES PATENTS

| Number | Name | Date |
|---|---|---|
| 2,197,399 | Stillwagon | Apr. 16, 1940 |
| 2,170,113 | Busch | Aug. 23, 1939 |
| 2,348,092 | Parke | May 2, 1944 |